United States Patent [19]

Wren

[11] 4,020,957
[45] May 3, 1977

[54] DETACHABLE TRUCK BED EXTENSION AND LOADING RAMP

[76] Inventor: Eugene Wilson Wren, Rte. 2, Morris, Ill. 60450

[22] Filed: Aug. 8, 1975

[21] Appl. No.: 603,005

[52] U.S. Cl. .............................. 214/38 R; 14/71.1; 214/85; 296/61
[51] Int. Cl.² ........................................ B65G 67/02
[58] Field of Search ................ 214/38 R, 38 D, 85, 214/85.1; 14/71, 72; 296/61

[56] References Cited

UNITED STATES PATENTS

| | | | |
|---|---|---|---|
| 986,903 | 3/1911 | Brown | 214/38 R |
| 2,437,479 | 3/1948 | Price | 214/85 |
| 2,587,265 | 2/1952 | Wright | 296/61 |
| 2,966,274 | 12/1960 | Price | 214/85 |
| 3,138,272 | 6/1964 | Flowers | 214/85 |
| 3,307,719 | 3/1967 | Martin | 214/85 |
| 3,720,335 | 3/1973 | Ward | 214/85 |

Primary Examiner—Trygve M. Blix
Assistant Examiner—Charles E. Frankfort
Attorney, Agent, or Firm—Hill, Gross, Simpson, Van Santen, Steadman, Chiara & Simpson

[57] ABSTRACT

A detachable truck bed extension and loading ramp for use with trucks having a truck bed employed in carrying heavy construction machinery or the like is provided. The loading ramp is securely attached to the rear edge of the truck bed and, when in a transporting position, two triangular lower sections thereof are folded over and upon two triangular upper sections, thereby providing a convenient truck bed extension. A base plate, which also serves as the truck bed extension and which in the transportation position, rests upon four base pieces of the lower sections. The lower sections are connected by hinges to the upper sections. The upper sections are securely mounted by means of bolts and weight bearing grooves to the back of the truck in such fashion that the top ends of the ramp panels are flush with the edge of the truck bed.

6 Claims, 10 Drawing Figures

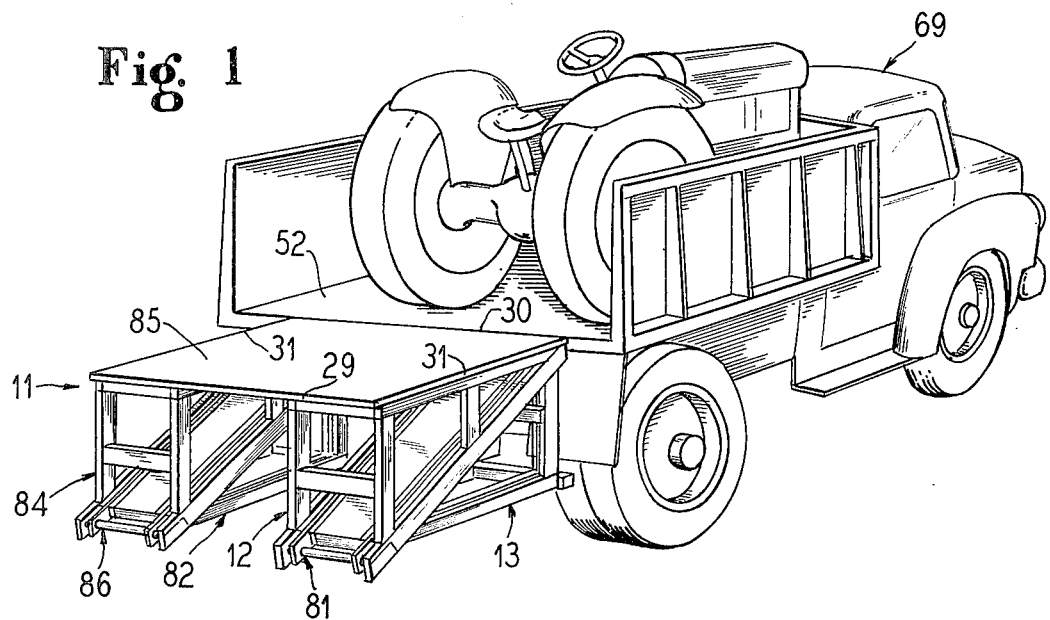
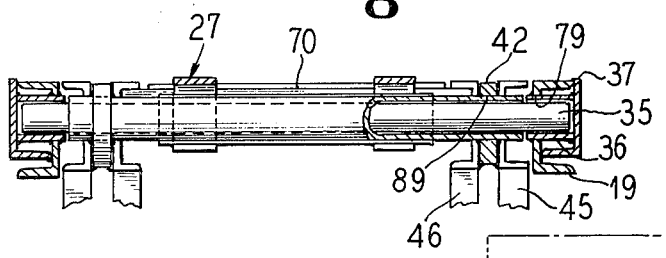
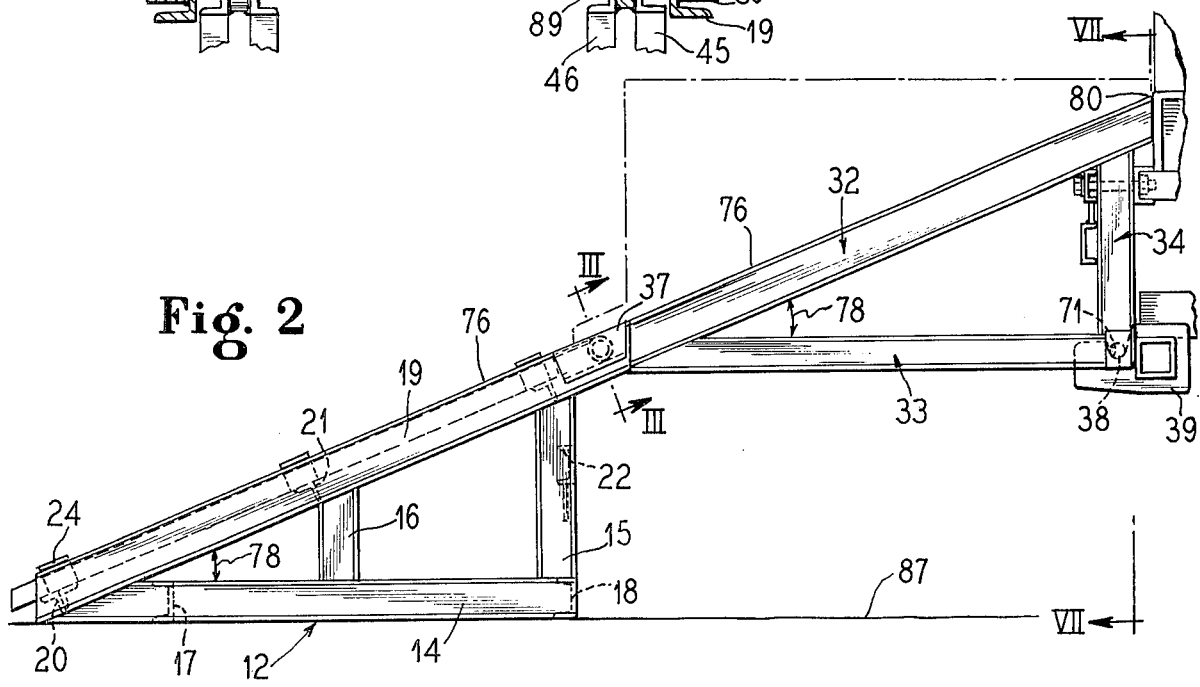

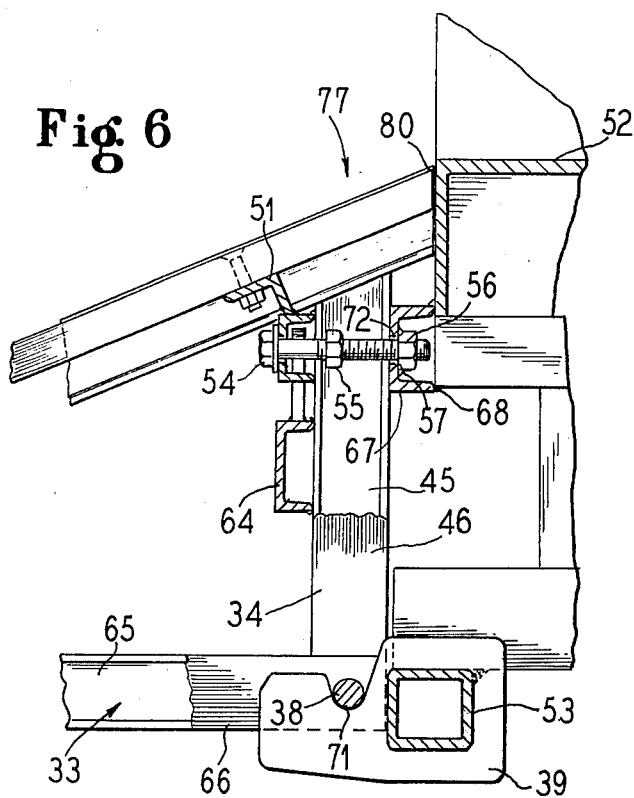
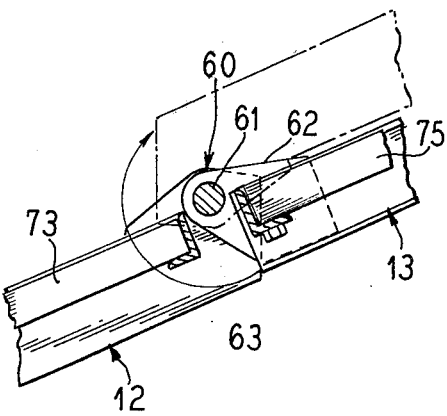
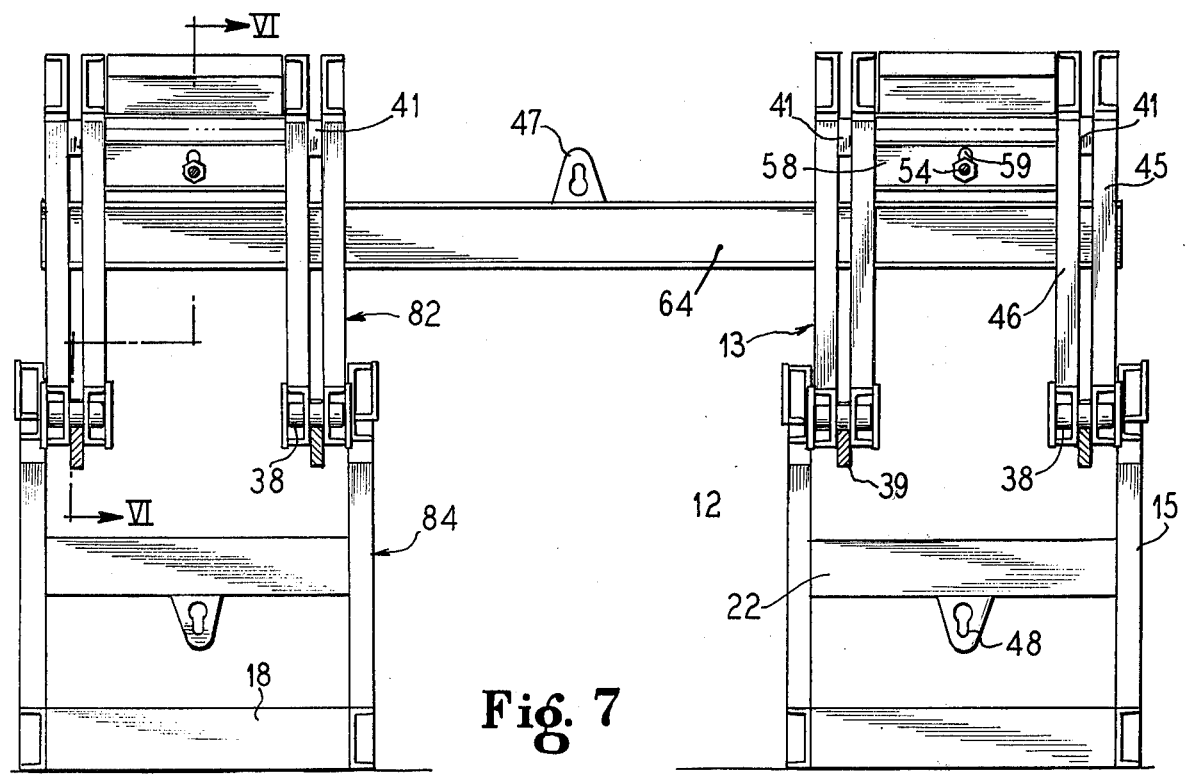

DETACHABLE TRUCK BED EXTENSION AND LOADING RAMP

BACKGROUND OF THE INVENTION

1. Field of the Invention

This invention relates to a truck loading ramp, and more particularly to a loading ramp for heavy equipment which is detachable and which, in a transportation position, serves as a truck bed extension.

2. Description of the Prior Art

Various configurations of truck bed loading ramps are known in the prior art. Most ramps for heavy machinery are large metal ramps which must be carried into position and carefully aligned with the treads or tires of the vehicle to be unloaded.

Large tailgates can be positioned in a horizontal position and serve as a truck bed extension. If the tailgate is lowered until the outer edge contacts the ground, the tailgate could then also be used as a loading ramp. The disadvantage, however, with such an arrangement would be the steep angle of incline provided by such a tailgate. In addition, most tailgate assemblies would not have sufficient structural strength and stability to permit use with heavy machinery.

Prior art ramps are usually of the portable variety and must be stored at the construction site or in an unused portion of the truck. If the truck is full, no room may be available for ramp storage. If stored at the construction site, it may be stolen, misplaced, or damaged.

Another disadvantage of portable prior art ramps is the difficulty caused by the bump created by the overlap of the ramp top at the edge of the truck bed.

Although permanently mounted prior art truck ramps may have a top portion which is flush with the truck bed, the permanent mounting can be inconvenient, since the rear of the truck is blocked by the ramp when it is not in use for long periods.

Clearly, it is highly desirable to provide a loading ramp with a shallow angle of incline and of sufficient structural stability for use with heavy machinery. It is further desirable that such a loading ramp would also serve as a truck bed extension and be easily employed when needed for unloading heavy machinery. Also, a loading ramp should be capable of attachment to the rear of a truck during transportation, and easily detached when not in use.

SUMMARY OF THE INVENTION

According to the invention, a truck bed loading ramp with a shallow angle of incline is provided by use of two lower and two upper triangular sections which are hinged together such that in the loading position a continuous ramp surface is formed. A base plate is provided which can be attached to or laid upon the two lower ramp sections. Each lower section is hinged with an upper section. The upper sections are mounted such that the top portions are flush with the truck bed. The mounting mechanism is comprised of two locking bolts and four weight bearing grooves which provide for easy detachment of the loading ramp when it is not in use.

When the lower right triangular sections are folded over and upon the top right triangular sections in a transportation position, a rectangle is formed since the hypotenuse of the lower sections rests upon the hypotenuse of the upper sections. The top of this rectangle forms a resting point for the base plate which forms a continuous surface with the truck bed to provide a convenient extension when the ramp is not in use.

Structural rigidity is achieved by the use of vertical, middle, and end support members, together with other reinforcing cross members.

A transporting means is provided by three eye hooks, two of which are mounted on lower section cross supports and a third being attached to a main cross support which is attached to and between both upper sections. When the lower and upper sections are in the transportation position, these three eye hooks provide a three-point, horizontal planar attachment for stable movement of the truck loading ramp onto and away from the loading ramp mounting mechanism.

A principal object of this invention is to provide a detachable truck loading ramp with a shallow angle of incline which remains attached to the truck when on-board equipment is being transported.

A further object of the invention is to design the ramp such that when not in use for loading, it may also serve as a truck bed extension.

Another object of the invention is to provide a loading ramp with sufficient structural stability to accommodate heavy equipment.

A further object is to design the ramp to permit datachment when not in use.

Another object is to provide a smooth transition between the rear of the truck bed and the top of the ramp for gentle loading and unloading.

Yet another object is to provide a ramp which is attached to the rear of a truck for transportation without using valuable loading space, yet is easily detachable when not in use.

A further object is to provide a truck loading ramp which has a lower right triangular section hinged to an upper right triangular section wherein the top section is attached to the rear of a truck bed for transportation, wherein the upper and lower mating triangular sections form a rectangle thereby providing a surface for a truck bed extension plate, and which unfolds to a loading position to provide a long ramp of shallow incline.

BRIEF DESCRIPTION OF THE DRAWINGS

Other objects, features, and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a perspective view of a preferred embodiment of the detachable truck bed extension and loading ramp of this invention in a transportation position;

FIG. 2 is a side plan view of the loading ramp of this invention in loading position;

FIG. 3 is a fragmentary cross-sectional view taken along lines III—III of FIG. 2 showing details of a hinge means;

FIG. 6 is a fragmentary cross-sectional view along line VI—VI of FIG. 7 illustrating a detail of the loading ramp mounting mechanism;

FIG. 7 is a rear plan view illustrating the loading ramp of this invention in a loading position;

FIG. 8 is a fragmentary side view illustrating an alternative hinging arrangement;

DESCRIPTION OF THE PREFERRED EMBODIMENTS

Figure 4:
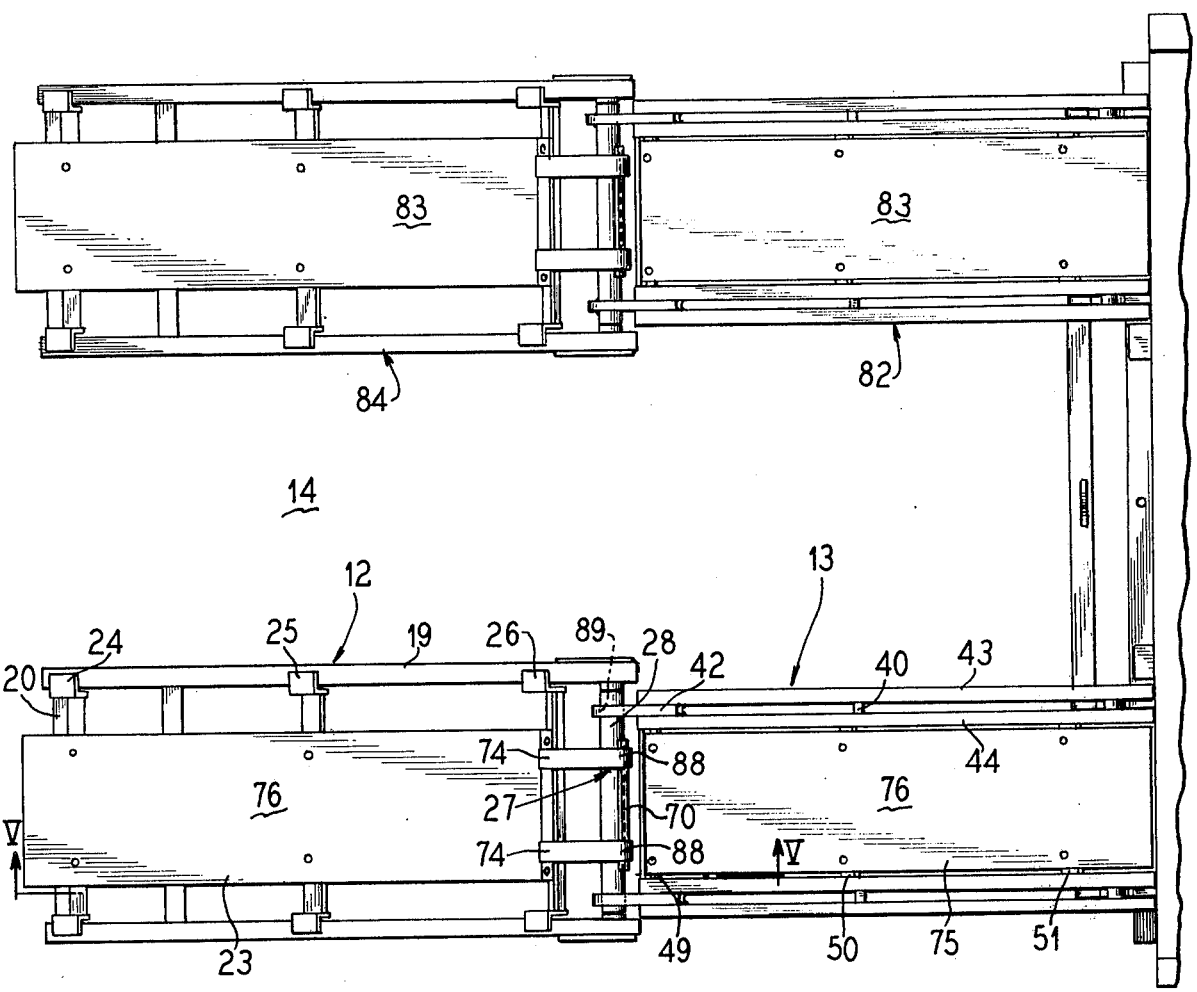
FIG. 4 is a top plan view of the loading ramp of this invention in a loading position.

Referring to FIG. 1 generally, a truck bed extension and loading ramp 11 is illustrated in the transportation position when mounted at the rear of a truck 69. First and second right-triangular shaped upper sections 13 and 82 are hinged at first hinge 81 and second hinge 86 to the right-triangular shaped lower sections 12 and 84. As shown in FIG. 1, when the lower triangular sections are folded over and upon the upper triangular sections hypotenuse to hypotenuse, a rectangle is formed.

The top surface of the rectangle provides a resting place for a base plate 85 which is placed in position when a rearward extension of the truck bed 52 is needed. The upper sections 13 and 82 are detachably mounted at the rear of the truck 69 such that an edge 30 of the base plate 85 is flush with a rear of the truck bed 52. The side edges 31 of the base plate 85 are in vertical alignment with outside edges of the first and second upper sections. A rear edge 29 of the base plate 14 is in approximate vertical alignment with the hinges 81 and 86.

A loading position for the ramp 11 is illustrated in FIGS. 2 and 4. Continuous first and second, spaced apart parallel ramp surfaces 76 and 83 are formed. These ramps form a shallow incline angle 78 with respect to the ground 87 since the folding feature of the ramp allows a long ramp surface length for typical truck bed heights.

Each upper 13 or 82 and lower 12 or 84 triangular section contains two base pieces, two end supports, two panel supports, and cross members. The base pieces form two spaced apart horizontal portions, the end supports form two spaced apart vertical portions, and the panel supports form two spaced apart hypotenuse portions connecting the vertical and horizontal portions. These portions form parallel right triangles which are spaced apart by the cross members. Ramp panels are carried by the panel supports and form a ramp surface between the supports.

In particularly describing the upper and lower triangular sections, reference should be made to the inherent symmetry of these sections. First and second lower sections 12 and 84 are of identical design and only first lower section 12 will be described. The same symmetry is true with respect to the first and second upper sections 13 and 82. Hence, only first upper section 13 will be described. Symmetrical elements will have the same reference numbers. A further symmetry within lower section 12 or upper section 13 is present between the left and right sides of each section, and the symmetrical elements will have the same reference numbers.

FIG. 2 illustrates first lower section 12 in the loading position. The section is formed of two parallel and spaced right triangles each having members 14, 19 and 15. Lower base pieces 14 join with lower panel supports 19 to form a shallow angle 78 for the lower portion of the first ramp surface 76. At the rear of first lower section 12, lower end supports 15 join at right angles with the ends of the lower base pieces 14 and extend upward to connection with the lower panel supports 19. A first cross support 17 and a second cross support 18 transversely connect lower base pieces 14. The second cross support 18 is located at the ends of the lower base pieces 14. The first cross support 17 is positioned intermediate the fronts and rear ends of lower base pieces 14. Middle supports 16 join at right anles with lower base pieces 14 at an intermediate point between the fronts and ends of lower base pieces 14. The middle supports 16 extend vertically to a junction with the lower panel supports 19.

Lower panels 23 located between the lower panel supports 19 are designed for simple removal prior to folding the lower sections over and upon the upper sections. A front support arm 24 is fastened to the front under-portion of each lower panel 23 at right angles to the ramp panels' lengthwise axis as clearly illustrated in FIG. 4. Similarly, a middle support arm 25 is fastened at the middle and an end support arm 26 is fastened at the end of each lower panel 23. These arms rest upon the top edges of the lower panel supports 19 to hold the panels in position. Since the arms are not fastened to the supports, panel removal is simple.

Figure 5:
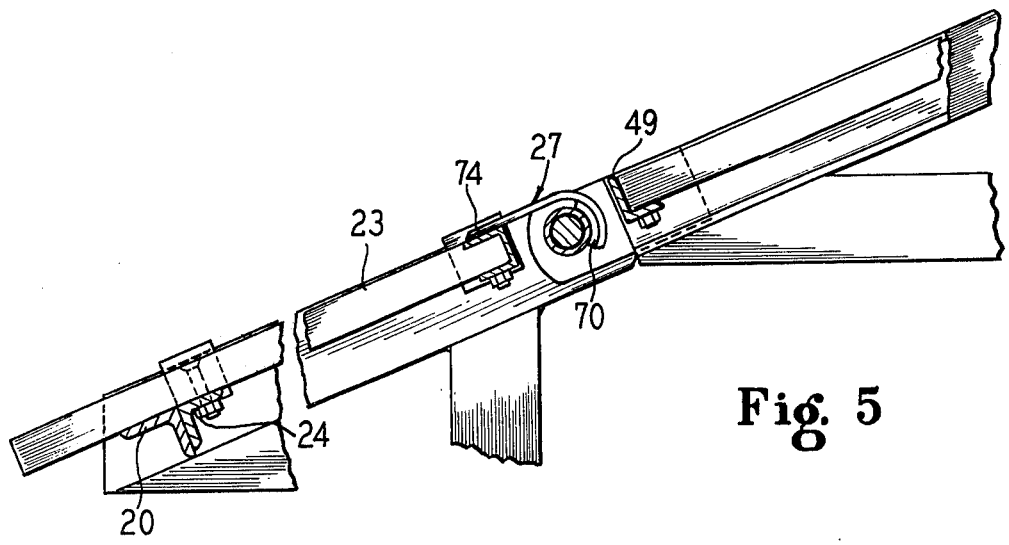
FIG. 5 is a fragmentary side view of the hinge means and lower and upper panel attachments along line V—V of FIG. 4.

When a lower panel 23 is removed, first L-bracket 20 positioned at the front of lower panel support 19 and second L-bracket 21 located at intermediate lower panel support 19 both serve as resting points for the lower sections when they are folded over and upon the upper sections in the transportation position. Since the lower panel supports 19 are spaced further apart than upper panel supports 32 discussed below, the upper panel supports directly contact the L-brackets in the transportation position. Also, first L-bracket 20 serves an additional purpose by being in weight bearing contact with the front support arm 24 of the lower panel 23, preventing the panel from sliding down, as particularly illustrated in FIG. 5.

A panel hook 27 is fastened to each lower panel 23 by two hook fasteners 74. Each panel hook 27 consists of two curved arms 88 and a hook cross member 70 located at the end of and connecting said arms. When the lower panels 23 are laid between the lower panel supports 19, the front, middle, and end support arms 24, 25 and 26 are resting upon the top surface of lower panel supports 19. The panel hooks 27 are positioned around hinge tubes 28 attached to the upper sections as described below, thereby preventing downward slippage of lower panels 23 and also serving to bolster the support given by first L-brackets 20.

FIG. 3 illustrates the detailed hinging mechanism which joins first lower section 12 to first upper section 13 and second lower section 84 to second upper section 82. Hinging action is achieved by use of hinge rods 35, the ends of which are contained in pipe stubs 36. These stubs are mounted interiorly of holes 79 near the rear ends of lower panel supports 19. The ends of the stubs are secured by pipe stub supports 37. The hinge rods 35 have a slightly smaller diameter than the inside diameter of hinge tubes 28, thus allowing the insertion of the hinge rods 35 through hinge tubes 28 attached to the upper sections as described below.

The upper sections 13 and 82 form the upper portions of first and second ramp surfaces 76 and 83. Each section has two spaced and parallel right triangular sections forming the sides thereof. These sides, in turn, are each comprised of two additional very narrowly spaced inner and outer right triangular sections. Hence, each upper section has four triangular portions as opposed to only two in each lower section.

The components of first upper section 13 are as follows: Upper base pieces 33 join with upper panel supports 32 to form a shallow angle of incline at the front of first upper section 13. Upper end supports 34 are joined at right angles to upper base pieces 33 and extend upward to join with the end portions of upper panel supports 32.

Each of the upper panel supports 32 is formed by an outer panel support member 43 and an inner panel support member 44. Spacing between these members is achieved with first spacers 40 and hinge tube support members 42. The first spacers 40 are located intermediate the lengthwise axis of upper panel supports 32. Each hinge tube support member 42 is sandwiched between front interior portions of the inner and outer members. A hinge tube 28 containing a hinge rod 35 is mounted between each hinge tube support member with the ends of the hinge rods passing through holes 89 in the hinge tube support members.

Each upper base piece 33 is comprised of inner 66 and outer 65 closely spaced base members, as illustrated in FIG. 6. Similarly, each upper end support 34 is comprised of inner 46 and outer 45 end members, as illustrated in FIG. 7. The inner 44 and outer 43 panel support members previously described join with the respective inner and outer base and end members to provide a pair of closely spaced parallel triangles, each pair comprising a side of first upper section 13.

An upper panel 75 is fastened interiorly of the inner panel support members 44 in each upper panel section. A third L-bracket 49, fourth L-bracket 50, and fifth L-bracket 51 are mounted in transverse fashion on upper panel 75 at the front, intermediate and approximate rear end portions of upper panel 75. These L-brackets are secured between the interior edges of the inner panel support members 44.

Details of the truck loading ramp 11 mounting mechanism are best illustrated in FIGS. 6 and 7. Four groove plates 39, each containing a groove 71, are welded to a rectangular, elongated groove support 53 which is welded to the frame of the truck 69 at a point below the rear edge of the truck bed 52. Two elongated, U-shaped nut supports 67 are also welded at 68 intermediate the rear edge of the truck bed 52 and the groove support 53. The positioning of the groove support 53 and nut supports 67 is such that the upper, rear edges 80 of upper panel 75 are flush with the truck bed 52. The groove pipes 38 align with the grooves 71 connected to the groove support 53. The mounting bolts 54, described below, align with the mounting nuts 56 welded to the nut supports 67.

Second spacers 41 are welded between the inner and outer end members 46 and 45 to provide spacing and structural rigidity at a point near the top of these end members. Spacing between the bottom ends of outer end members 45 and inner end members 46 is provided with the groove pipes 38. These groove pipes are weight bearing points which fit interiorly of grooves 71. Each of four groove plates 39 are positioned along the groove support 53 in alignment with the center portion of each of four groove pipes 38.

Mount supports are welded transverse the upper ends of inner end members 46. These mount supports 58 are positioned just below and in the angle junction formed by inner panel support members 44 and inner end members 46. A slot 59 is provided in the center of each mount support 58. A mounting bolt 54 is positioned through each slot 59 and retarding nuts 55 are threaded onto the mounting bolts to prevent said bolts from accidentally falling free of the slots when the loading ramp 11 is detached from the truck 69. Each mounting nut 56 is welded interiorly of each U-shaped nut support 67 in alignment with holes 72 drilled in the bolt supports 67. A weld 57 secures each mounting nut. The mounting bolts 54 are threaded into these mounting nuts 56 when the groove pipes 38 are positioned in grooves 71 to securely fasten the first and upper sections 13 and 82 to the truck 69.

FIG. 7 illustrates the use of main cross support 64 as both a carrying point with upward pointing second eye hook 47 located centrally thereof and also as a means for achieving structural rigidity between first and second upper sections 13 and 82. The main cross support 64 is welded to each of the interior edges of the end members and is vertically positioned at right angles intermediate each end member. A transverse third cross support 22 is interiorly welded at the approximate lengthwise midpoint of each of the lower end supports 15. First eye hooks 48 are mounted at the midpoint of the third cross supports 22 such that in the loading position of first and second lower sections 12 and 84, the first eye hooks 48 are aligned downwardly. When the lower sections are in the transportation position, the first eye hooks 48 and the second eye hook 47 form a convenient three-point horizontal mounting plane to which chains or the like may be attached for transporting the truck ramp 11 when it is detached from the truck 69. It is obvious that other methods for transporting the loading ramp 11 may be devised using a different number and placement of connecting points.

It is obvious that certain alternative embodiments of this invention are useful. An alternate method of hinging the lower sections and upper sections together illustrated by FIG. 8. In the previously mentioned embodiments, the lower panels 23 are removable to permit the lower sections to lie flush with the upper sections. First L-brackets 20 and second L-brackets 21 provide the weight bearing support surface for the lower sections when folded upon the upper sections. However, by use of the alternate hinging means, it is unnecessary to provide removable lower panels 23. Each alternate hinge 60 is comprised of two upper arms 62, two lower arms 63, and a pin 61. Since the center axis of the hinging pin 61 lies within the plane of non-removable lower panels 73 and upper panels 75, in the folded position the lower and upper panels are flush with one another, thus eliminating the need to remove the lower panels.

Though the base plate 85 is not permanently attached to the four lower base pieces 14 of the lower sections in the preferred embodiment, it is obvious that the base plate could be permanently mounted to these base pieces.

The structural elements of the loading ramp are preferably constructed of metal and most joints are welds. However, it should be understood that other strong materials such as wood could be used.

Although the preferred embodiment discloses the use of first and second spaced and parallel ramp surfaces 76 and 83, it is obvious that two planar surfaces could replace the parallel ramp surfaces, at a sacrifice of additional weight. One planar surface could be mounted to the hypotenuses of the lower sections, covering the entire area between the outermost lower panel supports. The other planar surface could be mounted to the hypotenuses of the upper sections, covering the entire area between the outermost upper panel members. If the planar surface is of sufficient rigidity, loads not directly over the lower and upper sections could be supported and a loading ramp would be adaptable to a wide variety of wheel base widths.

Figure 9:
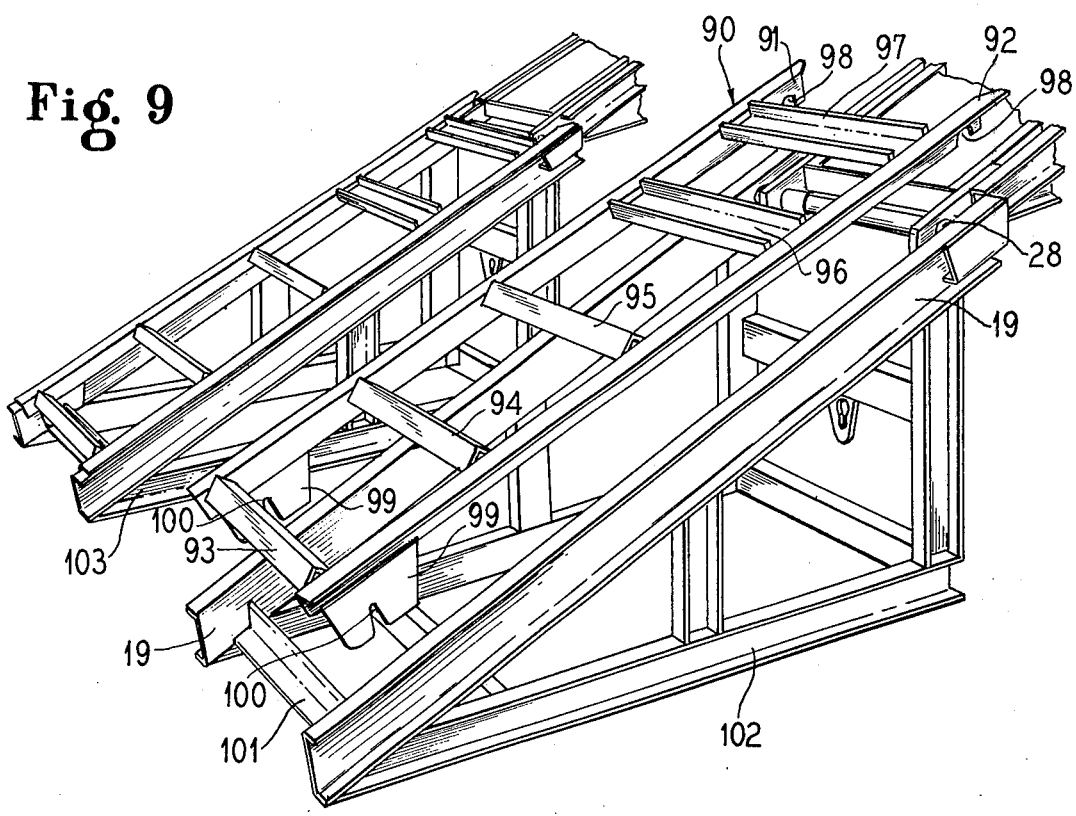
FIG. 9 is a fragmentary perspective view of the loading ramp of this invention showing an alternate lower panel construction.
Figure 10:
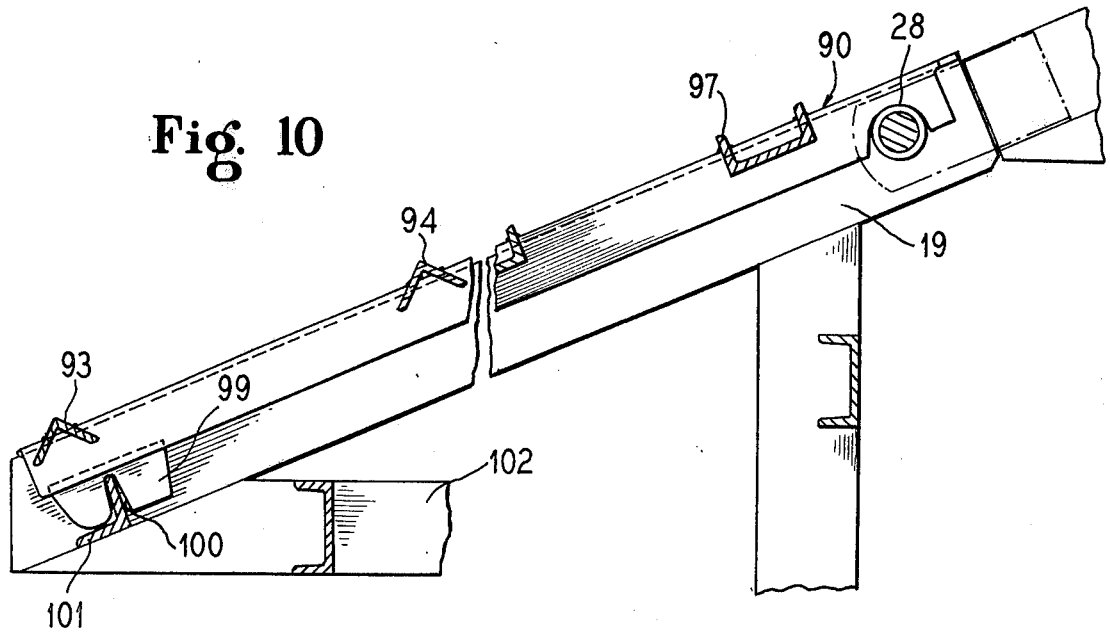
FIG. 10 is a fragmentary side view of the alternate lower panel in loading position.

Removable lower panels 90 shown in FIGS. 9 and 10 illustrate an alternate, all metal construction of the wooden lower ramp panels previously described.

Each lower ramp panel comprises two, L-shaped lower panel supports 91 and 92 spaced parallel to one another. The support spacing is sufficient to permit outward facing flanges to rest upon the top surfaces of each of the lower panel supports 91 and 92.

The panel supports 91 and 92 are spaced apart by three L-shaped cross-pieces 93, 94, and 95 welded with the included angle faced below the supports. Two U-shaped cross-pieces 96 and 97 are also spaced between the panel supports, with the interior of the "U" facing above the supports. The L-shaped cross-pieces are positioned toward the leading edge and the U-shaped cross-pieces toward the trailing edge of each lower ramp panel 90.

Each lower ramp panel interlocks with each of the lower ramp sections 102 and 103 by a cutout means 98 on each panel support. These cutouts engage with hinge tubes 28. For added support, a flange 99 having a cut 100 is connected at the lower portion of each panel support. The cut 100 engages a flange of an L-shaped cross-piece 101 connected between the lower portion of panel supports 91 and 92.

Although the teachings of my invention have herein been discussed with reference to specific theories and embodiments, it is to be understood that these are by way of illustration only and that others may wish to utilize my invention in different designs or applications.

I claim as my invention:

1. A detachable truck bed extension and loading ramp useful with a truck having a bed, comprising a lower portion, a hinge means connecting said lower portion to an upper portion, a mounting means for connecting said upper portion to the rear of said truck such that a top end portion of said upper portion is flush with said truck bed, carrying means for transporting said loading ramp and truck bed extension into position for mounting, a base plate effective as a truck bed extension resting upon said lower sections in a transportation position, said lower portion comprising first and second right triangular shaped lower sections and said upper portion comprising first and second right triangular shaped upper sections, and said mounting means comprising lower weight bearing grooves for receiving groove pipes and upper nut supports with mounting nuts attached thereon for receiving mounting bolts.

2. A detachable truck bed extension and loading ramp useful with a truck having a bed, comprising a lower portion, a hinge means connecting said lower portion to an upper portion, a mounting means for connecting said upper portion to the rear of said truck such that a top end portion of said upper portion is flush with said truck bed, carrying means for transporting said loading ramp and truck bed extension into position for mounting, a base plate effective as a truck bed extension resting upon said lower sections in a transportation position, said lower portion comprising first and second right triangular shaped lower sections and said upper portion comprising first and second right triangular shaped upper sections, and said mounting means comprising lower weight bearing means on said truck for disengageably receiving a support member on said upper portion, and fixed mounting means on said upper portion above said weight bearing means.

3. A detachable truck bed extension and loading ramp as claimed in claim 2, wherein each of said lower sections comprises:
   a. two lower base pieces, two lower, vertically extending end supports at the ends of and in perpendicular relation to said lower base pieces, two upwardly extending middle supports at the intermediate portion of and in perpendicular relation to said lower base pieces, two parallel lower panel supports, the front ends of which are joined with the front ends of said lower base pieces and extending obliquely upward and rearward to junctions with said middle supports at the approximate lengthwise center of said lower panel supports and junctions with said lower end supports at the approximate rear ends of said lower panel supports, and removable lower ramp panels between said lower panel supports of each lower section; and
   b. wherein each of said upper sections comprises two upper base pieces, two upper end supports connected to and extending vertically from rear ends of said upper base pieces, two upper panel supports connected to fronts of said upper base pieces and extending obliquely upward and rearward to a junction with said upper end pieces, and upper panels between said upper panel supports.

4. A detachable truck bed extension and loading ramp as claimed in claim 2, wherein said resting base plate is fixedly attached to said lower sections.

5. A loading ramp for trucks comprising two spaced-apart upper ramp members, means for attaching said upper ramp members to a truck, two spaced-apart lower ramp members, hinge means connecting the upper and lower ramp members, said lower ramp members pivotable around the hinge means from a loading position with portions of the lower ramp members forming a ramp extension from an end of the upper ramp members to a transport position stop said upper ramp members with second portions of the lower ramp members positioned to form a horizontal extension of a bed of a truck to which the ramp members are attached, a removable lower ramp panel having L-shaped lower panel supports spaced apart by cross-pieces, flanges of said lower panel supports resting upon said lower ramp member, and means for interlocking said lower ramp panel to said lower ramp member.

6. A detachable truck bed extension and loading ramp useful with a truck having a bed comprising in combination:
   a. first and second lower sections each having two spaced apart, parallel lower base pieces, two lower end supports located at a rear end of said lower base pieces and in perpendicular relation thereto, two middle supports located intermediate a front and said rear end of each of said lower base pieces and in perpendicular relation thereto, two spaced apart and parallel lower panel supports, a front edge of each being joined with said front of each of said lower base pieces, said lower panel supports extending obliquely upward and rearward to an approximate middle position wherein said panel supports join with a top of said middle supports and further rearward and upward where said lower panel supports join with upper ends of said lower end supports, a removable lower panel having support arms attached to a bottom of said lower panel and adapted to rest on L-brackets having end portions attached to said lower panel supports and extending therebetween;

b. first and second upper sections each having two parallel upper base supports, two upper end supports in perpendicular relationship to and at a rear end of said upper base supports, two upper panel supports front edges of which are joined with front edges of said upper base supports and a rear end portion of said upper panel supports being joined with said upper end supports, wherein said upper panel supports extend upward and rearward obliquely, each of said base supports having inner and outer base members, each of said upper end supports having inner and outer end members, each of said upper panel supports having inner and outer panel support members, and an upper panel located between said inner panel support members;

c. hinging means attaching said lower section to said upper section having a hinge tube attached to said upper section, a hinge rod of longer length than said hinge tube, said hinge rod of slightly smaller diameter than the inner diameter of said hinge tube and fitting within the interior of said hinge tube, and pipe stubs attached to said lower section on either side of said hinge rod and receiving the longer length of said hinge rod;

d. mounting means having a rectangular elongated groove support with four groove plates attached thereto, said groove plates having a groove for receiving each of four middle sections of four groove pipes which are mounted on the lower ends and between each of said outer and inner end members, a middle section of said groove pipe being received in each of said grooves, two nut supports mounted below a truck bed having a mounting nut welded in aligning relationship with a hole in said bolt support, two mount supports located on inner end members of each of said upper sections, said mount supports each having a slot for receiving a mounting bolt, and each mounting bolt engaging each mounting nut to firmly secure the upper sections to a truck; and e. carrying means having a first eye hook attached to a cross support on each of said bottom sections and a second eye hook mounted on a main cross support joining said two upper sections.

* * * * *